(No Model.) 3 Sheets—Sheet 1.

J. W. SWICKARD.
WHEEL PLOW.

No. 520,905. Patented June 5, 1894.

Witnesses:
Fred Gerlach
H. M. Richards

Inventor:
John W. Swickard,
By W. B. Richards,
Atty.

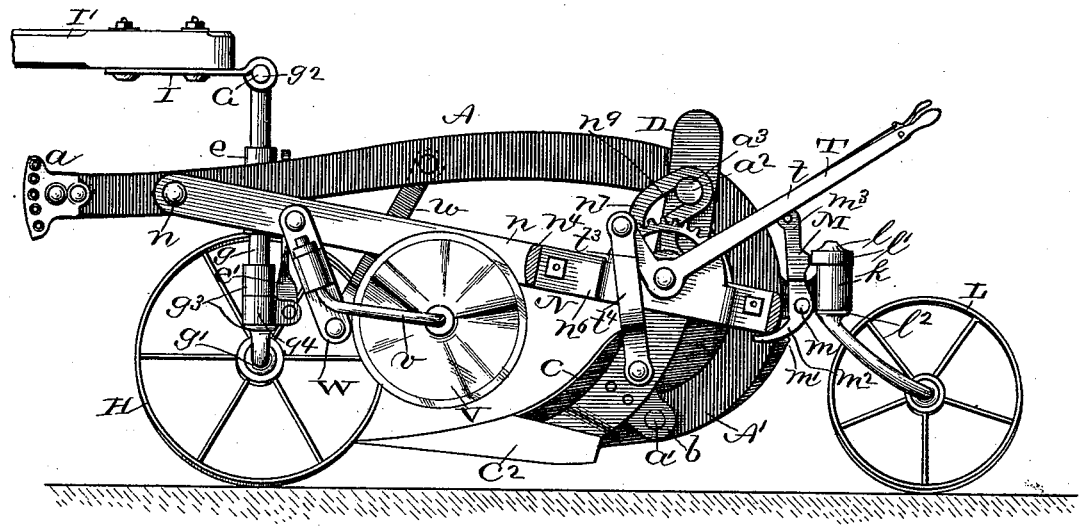

(No Model.) 3 Sheets—Sheet 3.

J. W. SWICKARD.
WHEEL PLOW.

No. 520,905. Patented June 5, 1894.

Witnesses:
Fred Gerlach
H. M. Richards.

Inventor:
John W. Swickard,
By W. B. Richards,
Att'y

UNITED STATES PATENT OFFICE.

JOHN W. SWICKARD, OF GALVA, ILLINOIS, ASSIGNOR TO EUGENIO K. HAYES, OF SAME PLACE.

WHEEL-PLOW.

SPECIFICATION forming part of Letters Patent No. 520,905, dated June 5, 1894.

Application filed February 3, 1894. Serial No. 498,999. (No model.)

*To all whom it may concern:*

Be it known that I, JOHN W. SWICKARD, a citizen of the United States, residing at Galva, in the county of Henry and State of Illinois, have invented certain new and useful Improvements in Wheel-Plows, of which the following is a specification.

The wheel plow to which the invention that is herein described pertains, is of that type or class known generally as three wheel plows, in which a frame supported on wheels is designed to support the plow, not only while elevated above the ground, but in all of its various adjustments, and especially to support the plow in operation and thus reduce the friction of its lower surface on the bottom of the furrow being made, by acting as a rolling support for the plow, when pressed downwardly by the force action of the furrow slice on its upper, wedge-shaped surface.

My present invention has for its object the production of an efficient wheel plow of the type referred to, one which shall combine with a maximum of effectiveness in operation, a minimum of lightness, simplicity, and economy of manufacture, and which shall be easily manipulated in all of its operations. In carrying out these objects of my invention, improvements have been evolved, which consist in novel structural features, novel organization of parts, novel assemblage, and disposition of parts, and novel combinations of parts, the separate and collective operations of which parts, their structural peculiarities, novel organization, assemblage and disposition, and novel combinations are hereinafter described, and are respectively made the subject matter of claims hereto appended.

In the accompanying drawings all my improvements are shown as embodied in the best way now known to me; obviously, however, while still within the purview of my invention, some or all of these parts may differ in their construction and assemblage or disposition for co-action, from my three wheel plow shown in the accompanying drawings, in which—

Figure 1:
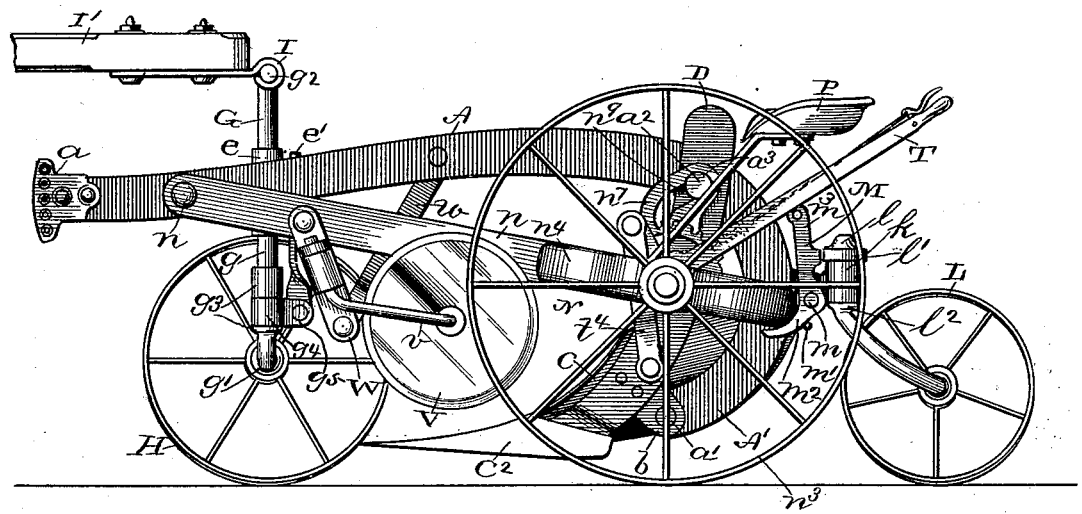
Figure 2:
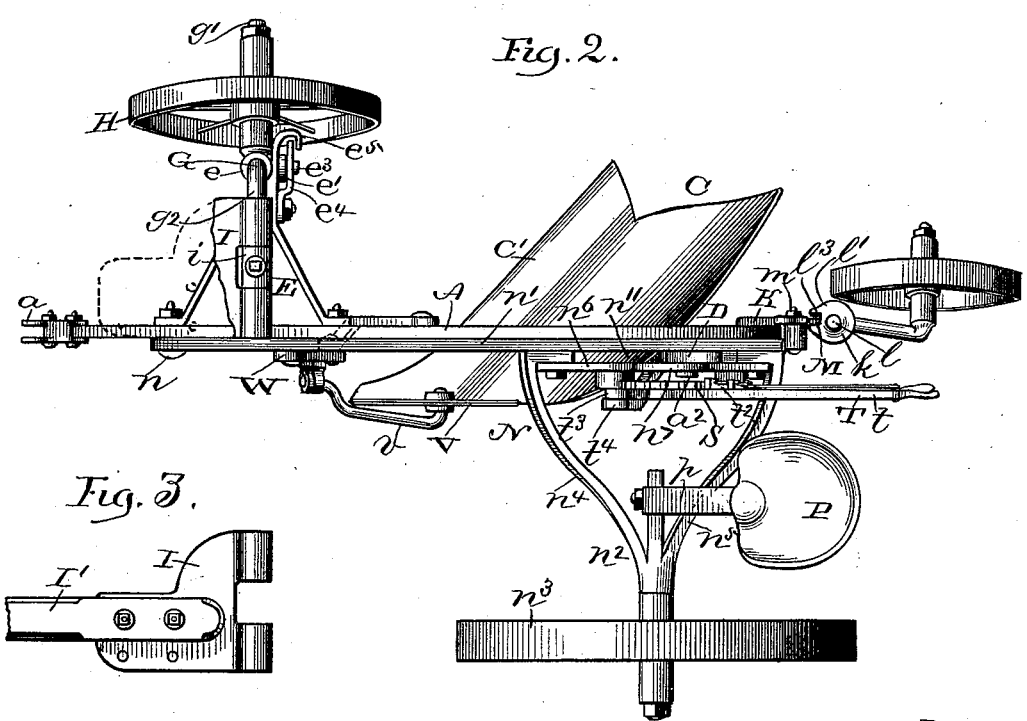
Figure 3:
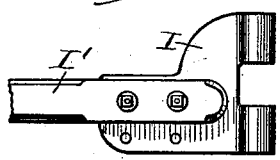
Figure 6:
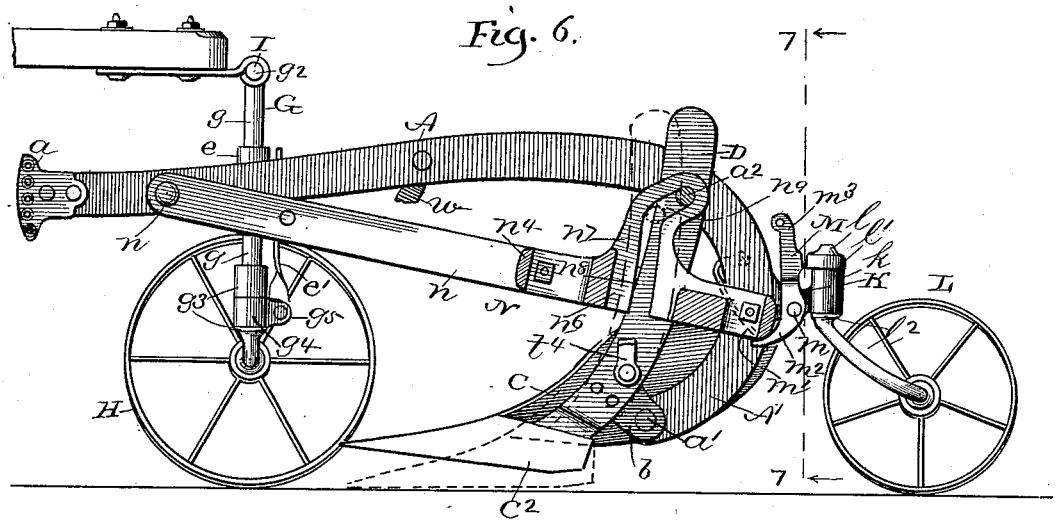
Figure 7:
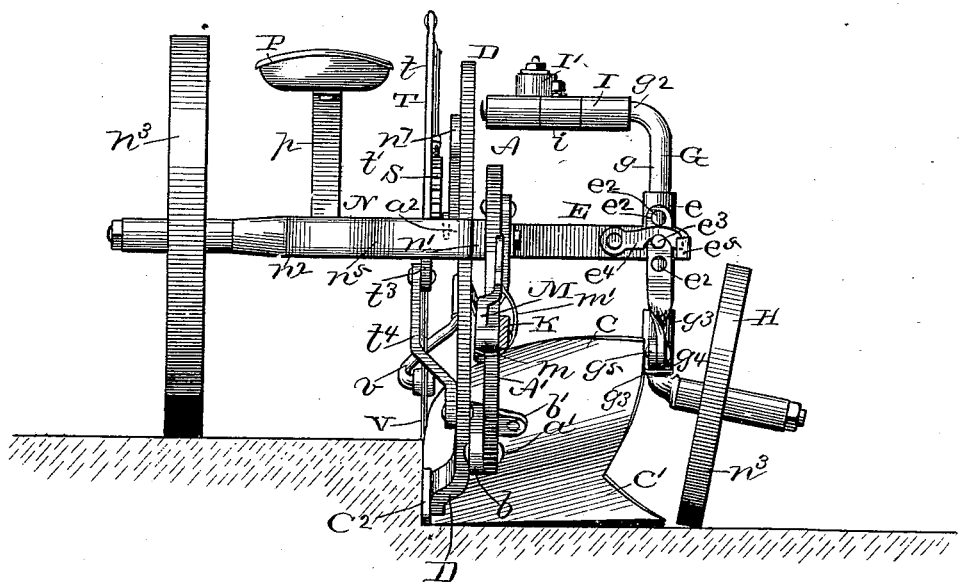

Figure 1 is a side elevation of my improved wheel plow, showing the parts as adjusted for supporting the plow above the ground, and entirely by the frame and wheels, and the tongue or guide pole partly broken away; Fig. 2, a top plan without the guide pole, the guide pole plate partly broken away, and showing the parts adjusted as at Fig. 1; Fig. 3, a top plan of the guide pole plate, and the end of the guide pole affixed thereto; Fig. 4, a side elevation, with the land wheel and its supporting bracket removed, and showing the remaining parts adjusted as at Fig. 1; Fig. 5, a side elevation of the same parts shown at Fig. 4, but showing them as adjusted for work, plowing; Fig. 6, a side elevation, with the land wheel and its supporting brackets, the hand lever and part of its connecting link, and the curved rack plate removed, and showing the remaining parts by full lines adjusted as at Figs. 1 and 4, and by dot lines adjusted as hereinafter described; Fig. 7, a rear elevation of parts, and sectional elevation of other parts, in the line 7—7, in Fig. 6, but showing forward of the line 7—7 all of the parts as in Fig. 1, but adjusted as at Fig. 5.

The plow beam, designated by the letter A, is provided at its forward end with a clevis $a$, for attachment of the draft animals, and has a downwardly extended and curved rear end A′, to the lower end of which one arm $b$ of an angle plate B is pivoted at $a'$, the other end $b'$ of which angle plate is bolted or otherwise fixed to the plow moldboard $c$. The moldboard $c$, share $c'$ and short landside bar $c^2$ are of ordinary construction, to form an ordinary plow, which is wedge-shaped laterally at its forward end to facilitate its cutting and furrow turning actions, and wedge shaped vertically to facilitate its passing beneath the furrow slice and to further aid in turning it, which furrow slice in turn presses downwardly on the plow with varying force, and thus produces the friction of the lower surface of the plow with the ground, which is converted from sliding friction into rolling friction by this class of plows.

Fixed at its lower end to the landside bar and to the arm $b$ of the angle plate B, is a plow standard D, which is preferably slightly curved, as shown, and extends upwardly to or above the upper side of the plow beam A. A short stud or pin $a^2$ projects laterally from the upper end portion of the standard D, for purposes hereinafter described.

Secured to the moldboard side of the plow beam at its forward end portion, is a bracket E, in the outer end of which is a bearing $e$ for a shaft G, having a vertical median portion $g$, and a lower end part $g'$, which is of outwardly bent form, as a spindle for the forward furrow wheel H, and an upper end part $g^2$, which is of inwardly bent form, as an arm on which the guide pole plate I is journaled, and held by a keeper $i$ which prevents movement of the plate I endlong of the arm $g^2$, while permitting it to oscillate vertically thereon, and thus permit the guide pole I' to rise and fall freely at its forward end without affecting the plow and frame, and allowing the plow and frame to rise and fall freely without affecting the guide pole. Between fixed collars $g^3$ on the submedian portion of the part $g$, is a fixed collar $g^4$, with an outwardly projecting arm $g^5$ to which is pivoted a link $e'$, which extends upwardly and has a series of holes $e^2$, either of which may be engaged with a pin or stud $e^3$ which projects from the outer end portion of the bracket E, for adjusting the forward furrow wheel H in higher and lower positions relatively to the plow beam A, the plow, the land wheel $n^3$, and rear furrow wheel L. The link $e'$ is retained on the stud $e^3$, after adjustments thereof, by a latch $e^4$ pivoted at one end to the bracket E, and engaged at its other end with a catch $e^5$ on the outer end of the bracket E, from which it is released by raising its distal end.

Projecting rearwardly from the arc shaped rear part of the plow beam to which it is fixed is a bracket K, the outer end of which carries a bearing head $k$ in which is swiveled the upper end part of the vertical standard $l$ of the caster wheel or furrow wheel L. The standard $l$ has a fixed collar $l'$ above the head $k$, and another, $l^2$, below it, and the upper collar $l'$ projects laterally over the head $k$ at its front side, and has a recess $l^3$ with which a detent lever M, pivoted at $m$ to the bracket K, is held in engagement by a spring $m'$ which acts on an arm $m^2$ that projects from its lower end. The upwardly projecting end $m^3$ of the lever M can be operated by hand or in any other ordinary manner to release it from the recess $l^3$ and thereby release the standard $l$ and caster wheel for turning at the ends of furrows without elevating the plow from the ground, in an ordinary manner. When the plow is elevated for turning, the arm $m^2$ is brought into contact with the rear end of the frame N, (see Fig. 6), and tilts the detent lever M, and thereby releases the caster wheel, until the plow is again lowered, and the arm $m^2$ released to permit the spring to again act on it. When the lever M is released it engages with the recess $l^3$ in an ordinary manner.

Journaled at $n$ to the plow beam A, and near to the forward end thereof, is a bar $n'$ which extends backwardly to and alongside of the rear curved end or part of the plow beam, with which it slides in contact as it (the bar $n'$) is swung or oscillated vertically, as hereinafter described. Projecting laterally and outwardly from the bar $n'$ is a bracket $n^2$, on the outer end of which is journaled the land wheel, or landside wheel $n^3$, and the inner end of which is preferably formed of two branches $n^4$, $n^5$, which are fixed to the rear end part of the bar $n'$. The bar $n'$ and bracket $n^2$ thus form a crank-shaped swinging frame N supported at one end by the bracket E and its wheel H which support the forward end of the plow beam, to which the frame N is journaled or hinged, and supported at its other end by the land wheel $n^3$. The driver's seat P is supported on the bracket $n^2$ by a spring bar $p$.

The upper end part of the plow standard D passes through a slot $n''$ formed by an interspace between the bar $n'$ and a plate $n^6$ fixed at its ends thereto, but it will be evident however, that this slot may be otherwise formed if preferred. From the mid-length part of the plate $n^6$, a bent standard $n^7$ projects upwardly, in which is a slot $n^8$, which extends downwardly through or across the plate $n^6$, as shown best at Fig. 6. The lower part and greater part of the slot $n^8$ is substantially at right angles to the bar $n'$, and its upper and shorter part $n^9$ extends at an angle inclined backwardly and upwardly from said longer part. The stud pin $a^2$ on the plow standard D, projects through the slot $n^8$, and is of such diameter as to fit snugly against the walls of said slot, so that it will at all times form a stay for the standard D, while permitting the slotted standard $n^7$ to slide up and down freely thereon.

The stud $a^2$ preferably has a head $a^3$ on its outer end, for retaining the standards D and $n^7$ in proper alignment, and as a stay for both. The standard D is rigidly fixed to the landside bar and moldboard, and thereby to the share, and being pivoted at $a'$ to the plow beam, the point of the plow will be raised by swinging the standard D rearwardly at its upper end, and lowered by swinging the standard D in an opposite direction. On the outer side of the plate $n^6$ a segment shaped rack bar S is fixed, the lower part of which covers the slot $n^8$ where it cuts the plate $n^6$, and forms a strengthening connection between the ends of the plate $n^6$.

The plow and rear furrow wheel are simultaneously raised and lowered and the plow thereby adjusted to plow at different depths, and also simultaneously "winged" or adjusted to run substantially level, laterally thereof, at all such different depths of plowing, by means of but one hand lever, thus introducing a new mode of operation. The hand lever is preferably a bell crank lever, with its center of motion at its angle where pivoted to the rack bar S. The longer arm $t'$ of the lever T is provided with an ordinary spring catch $t^2$ for engagement with and disengagement from the toothed rack bar, S, and its shorter arm $t^3$ is pivotally connected by a link $t^4$ with the lower end part of the plow standard D. The hand lever T, rack bar S and slotted standard $n^7$, are mounted and carried on the frame N.

For simultaneously raising the disk colter V with the plow, while carried on an arm secured to the bar $n'$, the colter standard $v$ is swiveled in a projecting part of a bar W, which is pivoted at its upper end to the side of the bar $n'$, and at its lower end to a link $w$, the upper end of which is pivoted to the plow beam. The link $w$, as will be seen on comparison of Figs. 4 and 5, will draw the swing bar W back at its lower end as the plow is raised, and force it downwardly as the plow is lowered, thus raising and lowering the colter at the proper time, with an attachment to the bar $n'$, out of the way of other parts.

In operation in the field, turning or swinging the hand lever T forwardly will by the evident action of the crank frame N not only lower the rear end of the plow beam, and the plow relatively to the frame N, but will wing the plow, or properly adjust the horizontal position laterally of its lower surface, and the spring dog $t^2$ can be engaged with teeth of the rack S to lock and hold the parts after such adjustments. As shown at Figs. 5 and 7, the plow is adjusted and held by the lock lever T, for deep plowing, after "first furrows" have been made, with the front wheel H in the previously made furrow, the land wheel $n^3$ on the unplowed land, and the wheel L in rear of the plow in the furrow being made. While adjusted as last described, "first furrows" can also be opened, with the wheels H and $n^3$ both running on unplowed land, and the wheel L in the furrow being made; but if desired, in opening "first furrows," to have the lower surface of the plow transversely thereof, run approximately "level," or in a plane substantially parallel with a plane connecting the lower surfaces of the wheels $n^3$ and H, such result can be substantially accomplished by adjusting the front furrow wheel H as hereinbefore described, to its lowest position relatively to the plow beam and wheel $n^3$.

By turning or swinging the hand lever T rearwardly, the plow and rear end of the plow beam will be raised relatively to the frame N, and by swinging the hand lever back to the position shown at Figs. 1, 2 and 4, and there locking it as described, the plow will be elevated and held entirely above the ground, for local transportation or movements from place to place, supported on the frame and the wheels H, $n^3$ and L.

In all operations of raising and lowering the plow, the stud pin $a^2$ slides or travels upwardly in the slot $n^8$ as the plow is raised, and slides or travels downwardly therein as the plow is lowered, and thus acts to hold the plow with its lower surface at the proper working angle from its point to its rear end. In raising the plow to its highest position above the surface of the ground, when its lower surface is slightly above the ground, as shown by dot lines at Fig. 6, the stud pin $a^2$, as it is carried upwardly with the plow standard D, enters the inclined upper part $n^9$ of the slot $n^8$, and in traversing said inclined part upwardly and rearwardly will force the upper end of the plow standard D rearwardly as the plow is further raised upwardly, and thus by means of the differential movement now introduced in the combination by the inclined part of the slot, will while simultaneously raising both the point and heel of the plow, raise its point end with an increased velocity over its heel end, so as to give the point end of the plow an increased height when the plow is at its highest position, as shown by full lines at Fig. 6, so that it may pass readily over uneven ground or over obstacles on the ground surface. In lowering the plow from its last described position the stud pin traversing the inclined part of the slot downwardly and forwardly will tilt or incline the standard D forwardly at its upper end, and lower the point or forward end of the plow more rapidly than its rear end, so that the plow will be presented to the surface of the ground with its point end lowest, to facilitate its entrance into the ground.

Having thus described my invention, what I claim as new, and desire to secure by Letters Patent, is—

1. In a three wheel plow, the combination substantially as hereinbefore described, with a plow beam, a forward furrow wheel mounted on the forward end part of said plow beam, a rear furrow wheel mounted on its rear end part, and a plow secured to and below its rear end part, of a crank-shaped frame pivotally connected with the plow beam and carrying a land wheel or supporting wheel on its free end, and means mounted on said frame whereby the plow, the rear end of the plow beam and the rear furrow wheel can be raised and lowered relatively to the land wheel.

2. In a wheel plow, the combination, substantially as hereinbefore described, with a plow beam having a downwardly curved rear end part, and a plow standard fixed to the plow, pivoted with the plow to the lower end part of the plow beam, and provided on its upwardly extended end with a laterally projecting stud pin, of a frame hinged at its forward end to the forward end part of the plow beam, provided with a slotted standard, in the slot of which said stud pin traverses as the plow is raised and lowered, and further provided with a supporting land wheel for its free end.

3. In a wheel plow, the combination substantially as hereinbefore described, with a plow beam having a downwardly curved rear end part, and a plow standard fixed to the plow, pivoted with the plow to the lower end part of the plow beam, and provided on its upwardly extending end with a laterally projecting stud pin, of a frame hinged at its forward end to the forward end part of the plow beam, provided with a supporting land wheel, and with a standard having a slot with an upper end part inclined rearwardly, in which inclined part of said slot the stud pin traverses in both raising and lowering the plow while above ground, with a greater velocity at its point end than at its heel end.

4. In a wheel plow, the combination substantially as hereinbefore described, with a plow beam having a downwardly curved rear end part, a plow standard fixed to the plow, pivoted with the plow to the lower end part of the plow beam, and provided on its upwardly extended end with a laterally projecting stud pin, a bracket secured to the front end part of the plow beam, and provided with a forward furrow wheel, and a rear furrow wheel, secured to the rear part of the plow beam, of a frame hinged at its forward end to the forward end part of the plow beam, provided with a supporting land wheel and a slotted standard, in the slot of which standard the stud pin on the plow standard traverses as the plow is raised and lowered, a locking lever and a link connecting said lever with the lower part of the slotted standard and the plow, whereby the plow can be adjusted in higher or lower positions relatively to other parts, and held after such adjustments.

5. In a wheel plow, the combination substantially as hereinbefore described, with a plow beam having a downwardly curved rear end part, and a plow standard fixed at its lower end to the plow, and secured with the plow to the lower end part of the plow beam, of a frame hinged at its forward end to the forward end part of the plow beam, provided with a slotted guide way in which the upper end of the plow standard is located, and with a lateral bracket, a supporting land wheel, a hand lever, and a link connecting the plow standard or plow with the hand lever.

6. In a wheel plow, the combination substantially as hereinbefore described, with a plow beam having a downwardly curved rear end part, a bracket fixed to its forward end part and provided with a front furrow wheel, a rear furrow wheel secured to its rear end, and a plow standard fixed at its lower end to the plow, and secured with the plow to the lower end part of the plow beam, and having a laterally projecting stud pin on its upper part, of a frame hinged at its forward end to the forward end part of the plow beam, provided with a slotted guide-way in which the upper end of the plow standard is located, and with a lateral bracket, a supporting land wheel, a slotted standard, a hand lever, and a link connecting the hand lever with the plow standard or plow.

7. In a wheel plow, the combination substantially as hereinbefore described, with a plow beam having a downwardly curved rear end part, a bracket fixed to its forward end part and provided with a front furrow wheel, a rear furrow wheel secured to its rear end, and a plow standard fixed at its lower end to the plow and secured with the plow to the lower end of the plow beam, and provided with a laterally projecting stud pin on its upper end part, of a frame hinged at its forward end to the forward end part of the plow beam, and provided with a slotted guide-way in which the upper end of the plow standard slides, and with a lateral bracket, a supporting land wheel, a slotted standard, a rack bar, a lever with a link connection with the plow standard or plow, and a driver's seat mounted on said hinged frame.

8. In a wheel plow, the combination substantially as hereinbefore described, with a plow beam having a downwardly curved rear end part, a bracket fixed to its forward end part and provided with a front furrow wheel, a rear furrow wheel secured to its rear end, and a plow standard fixed at its lower end to the plow and secured with the plow to the lower end of the plow beam, and provided with a laterally projecting stud pin at its upper end part, of a frame hinged at its forward end to the forward end part of the plow beam, provided with a slotted guide-way in which the upper end of the plow standard slides, and with a lateral bracket supported at its outer end by the land wheel, a slotted standard, a driver's seat, and means mounted on said frame for raising and lowering the plow.

9. In a wheel plow, the combination substantially as hereinbefore described, with a plow beam having a downwardly curved rear end part, a bracket fixed to its forward end part and provided with a front furrow wheel, a plow secured to the lower end of the plow beam, a caster wheel swiveled in a bearing at the rear end of the plow beam, a recessed enlargement on the caster wheel standard, a bell crank lever journaled on the plow beam, and a spring; of a frame hinged at its forward end to the forward end of the plow beam, and provided with a supporting land wheel, and means for raising and lowering the plow beam, whereby one end of the bell crank lever is brought into contact with the rear end of the swinging frame, to release the caster wheel when the plow is elevated for turning at the ends of furrows.

10. In a wheel plow, the combination substantially as hereinbefore described, with a plow beam having a downwardly curved rear end part, with a plow secured thereto, a rear furrow wheel secured to its rear end, and a bracket fixed to its forward end, provided with a vertically adjustable front furrow wheel, of a frame hinged at its forward end to the forward end of the plow beam, and provided with a bracket and supporting land wheel at its rear end and with means for adjusting its rear end and the land wheel relatively to the plow beam, and the front furrow wheel.

11. In a three wheel plow, the combination substantially as hereinbefore described, with a plow beam, a forward furrow wheel mounted on the forward end part of said plow beam, a rear furrow wheel mounted on its rear end part, and a plow secured to and below its rear end part, of a crank-shaped frame pivotally connected with the plow beam and carrying a land wheel or supporting wheel on its free end, a single lock lever mounted on said crank shaped frame, and means for pivotally connecting said lever with the plow or plow beam, whereby through the action of the crank-shaped frame, and by said single lever, the plow and rear furrow wheel can be raised and lowered relatively to the land wheel, and the plow be properly winged simultaneously with its rising and falling movements.

12. In a wheel plow, the combination substantially as hereinbefore described, with a plow beam and plow, and a frame pivoted at its forward end to the forward end part of the plow beam, supported at its rear end on the land wheel, and provided with means for raising and lowering the plow, of a colter, swiveled to a pendent bar which is pivoted at its upper end to said frame, and a link pivotally connecting the pendent bar and the plow beam, all combined in such manner that the colter will be automatically brought into proper working position relatively to the plow in all adjustments of the plow, while supported by the plow beam and frame.

13. In a three wheel plow, the combination substantially as hereinbefore described, with a plow beam, a forward furrow wheel mounted on the forward end part of said plow beam, a rear furrow wheel mounted on its rear end part, and a plow pivoted to and below its rear end part, of a crank-shaped frame pivotally connected with the plow beam and carrying a land wheel or supporting wheel on its free end, a single lock lever mounted on said crank-shaped frame, and means for pivotally connecting said lever with the plow or plow beam, whereby by the action of the crank-shaped frame and by said single lever, the plow can be simultaneously raised and lowered, and a standard fixed to the plow, and means interposed between said standard and the plow beam whereby raising and lowering the plow by the single lever will tilt, and raise and lower the plow with a differential movement.

14. In a three wheel plow, the combination substantially as hereinbefore described, with a plow beam, a forward furrow wheel mounted on the forward end part of said plow beam, a rear furrow wheel mounted on its rear end part, and a plow secured to and below its rear end part, of a crank-shaped frame, pivoted at its forward end part to the forward end part of the plow beam and provided at its rear end and outer side with a land wheel, and a single lever mounted on said crank-shaped frame, and means for connecting said lever with the plow, whereby by means of said single lever the plow and rear furrow wheel can be raised, lowered and adjusted relatively to the land wheel.

In testimony whereof I affix my signature in presence of two witnesses.

JOHN W. SWICKARD.

Witnesses:
OSCAR ANDERSON,
JONAS W. OLSON.